Dec. 12, 1939.  L. GREER  2,183,396
DYNAMO-ELECTRIC MACHINE
Filed April 28, 1938
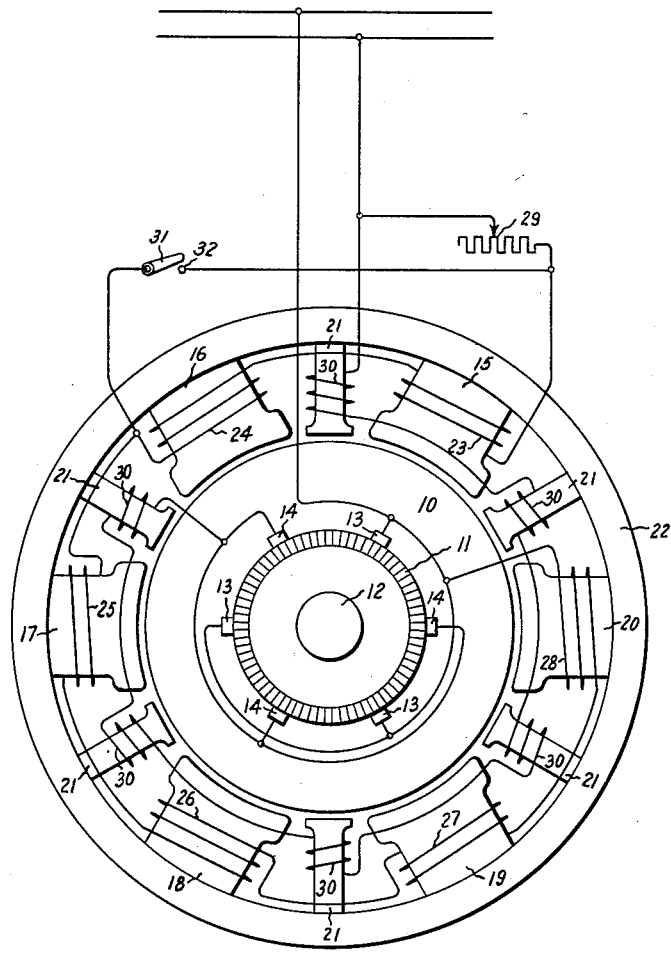
Inventor:
Lanier Greer,
by Harry E. Dunham
His Attorney.

Patented Dec. 12, 1939

2,183,396

UNITED STATES PATENT OFFICE 2,183,396

DYNAMO-ELECTRIC MACHINE

Lanier Greer, Erie, Pa., assignor to General Electric Company, a corporation of New York Application April 28, 1938, Serial No. 204,871

4 Claims. (Cl. 171—227)

My invention relates to dynamo-electric machines, and more particularly to an improved construction of a magnetic field excitation system for generators adapted to operate under widely varying operating conditions.

Certain types of generators are arranged to be connected to supply power under various operating conditions and to maintain a voltage within predetermined limits for these various operating conditions. In certain instances such generators are arranged to supply a main load at a given speed and to supply a relatively small auxiliary load at a different operating speed and yet maintain the voltage of the generator within a predetermined range. In such generators it is desirable that the magnetic circuit should be maintained substantially saturated in order to obtain a stable operation of the machine under the different operating conditions.

An object of my invention is to provide an improved generator magnetic field excitation system.

Another object of my invention is to provide a generator magnetic field excitation system having pole pieces arranged to be substantially magnetically saturated and an arrangement for varying the pole pieces excited to saturation without forming consequent poles or any substantial excitation in pole pieces not substantially excited to saturation.

Further objects and advantages of my invention will become apparent and my invention will be better understood from the following description referring to the accompanying drawing, and the features of novelty which characterize my invention will be pointed out more particularly in the claims appended to and forming a part of this specification.

The drawing is a schematic diagram of a generator provided with a magnetic field excitation system arranged in accordance with my invention.

The embodiment of my invention illustrated in the drawing comprises a rotatable member or armature 10 of an electric generator having a suitable winding connected to a commutator 11 and mounted upon a shaft 12. An electrical load may be connected to the generator by a set of brushes 13 and 14, and the desired field excitation is provided by a stationary member having a plurality of circumferentially spaced-apart main pole pieces 15, 16, 17, 18, 19, and 20 and commutating pole pieces 21 arranged intermediate the main pole pieces. The main pole pieces 15, 16, 17, 18, 19, and 20 are mounted on a supporting frame 22 of magnetic material and are excited by field exciting windings 23, 24, 25, 26, 27, and 28, respectively, arranged so that adjacent pole pieces are of opposite polarity. The main field exciting windings are connected in series with each other and across the terminals of the generator in series with a variable resistance 29, and the commutating pole pieces 21 are excited by field exciting windings 30 connected in series with each other and in series between one of the terminals of the generator and the set of brushes 14.

In a generator of this type, which is intended to supply a substantially constant voltage or a voltage which will vary only within a predetermined range, and which is adapted to supply this voltage to widely varying loads, such as a main load and a relatively small auxiliary load, the demagnetizing component of armature reaction of the generator will be substantially less when only an auxiliary load is connected to the generator than when it is operating under full load conditions. Furthermore, with certain types of prime movers the speed of the prime mover, and therefore the speed of the generator, will vary with the different loads on the generator. With these different operating conditions it is desirable that the exciting pole pieces of the magnetic field excitation system should remain substantially saturated in order to maintain a stable operation of the machine. In order to maintain such a saturated condition of these pole pieces and maintain the generator voltage within the desired predetermined range, the pole pieces substantially excited to saturation are arranged to be varied in accordance with predetermined operating speed and load conditions to maintain a substantially constant generator voltage. In varying the number of pairs of pole pieces, it is desirable to provide an arrangement which will not produce consequent poles or any substantial excitation in the pole pieces which are not substantially excited to saturation. In order to do this, a shunting switch provided with contacts 31 and 32 is connected across the field exciting windings 23 and 24 on adjacent pole pieces 15 and 16 and is operable in accordance with predetermined operating speeds and loads of the generator to shunt out these two field exciting windings by closure of the contacts 31 and 32, thereby deenergizing these two adjacent windings. I have found that under certain operating conditions when a generator of this type is driven by a prime mover such as an internal combustion engine, the speed under full load conditions may be about 1400 R. P. M., whereas when the generator is operating at very light loads the speed may drop to about 800 R. P. M. If it is desired to maintain a substantially constant voltage at both of these widely different speeds, I have found that stable operation of the generator can be obtained if only four of the main field exciting windings 25, 26, 27, and 28 are excited at the higher speed and if all of the main field exciting windings are excited at the lower operating speed. By deenergizing the adjacent field exciting windings 23 and 24 of the adjacent main pole pieces 15 and 16, no substantial excitation or consequent poles are produced in these two main pole pieces and the remaining pole pieces of the magnetic field excitation system operate under substantially magnetically saturated conditions, thereby maintaining a stable operation of the generator.

While I have described and illustrated an embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to obtain by Letters Patent of the United States is:

1. An electric generator, a magnetic field structure for said generator including a plurality of pole pieces, field exciting windings for said pole pieces, means for energizing said field exciting windings arranged to provide substantially magnetically saturated pole pieces, and means operable in accordance with predetermined operating conditions of said generator for connecting said field exciting windings to said energizing means and for varying the pole pieces substantially excited to saturation without producing any substantial excitation in pole pieces not substantially excited to saturation.

2. An electric generator, a magnetic field structure for said generator including a plurality of pairs of adjacent circumferentially spaced apart pole pieces, field exciting windings for said pole pieces, means for energizing said field exciting windings arranged to provide substantially magnetically saturated pole pieces, and means operable in accordance with predetermined operating conditions of said generator for connecting said field exciting windings to said energizing means and for varying the pairs of pole pieces substantially excited to saturation without producing any substantial excitation in pole pieces not substantially excited to saturation.

3. An electric generator, a magnetic field structure for said generator including pairs of adjacent pole pieces, each of said pairs of pole pieces including pole pieces of opposite polarity, field exciting windings for said pole pieces, means for energizing said field exciting windings arranged to provide substantially magnetically saturated pole pieces, and means operable in accordance with predetermined operating conditions of said generator for connecting said field exciting windings to said energizing means and for varying the pairs of pole pieces substantially excited to saturation.

4. An electric generator adapted to operate at widely varying speeds, a magnetic field structure for said generator including a plurality of pairs of adjacent pole pieces, each of said pairs of pole pieces including pole pieces of opposite polarity, field exciting windings for said pole pieces, means for energizing said field exciting windings arranged to provide substantially magnetically saturated pole pieces, and means operable in accordance with predetermined operating speeds of said generator arranged to connect said field exciting windings to said energizing means and to vary the pairs of pole pieces substantially excited to saturation without producing any substantial excitation in pole pieces not substantially excited to saturation for providing substantially the same generator voltage at said predetermined operating speeds.

LANIER GREER.